A. LETORT.
MACHINE FOR BREAKING AND PACKAGING BLOCKS OF SUGAR.
APPLICATION FILED JUNE 5, 1912.

1,084,887.

Patented Jan. 20, 1914.
5 SHEETS—SHEET 1.

Witnesses
John H. Hoving
B. R. W. Blake

Inventor
Alfred Letort
By H. van Dedemmel
Attorney

A. LETORT.
MACHINE FOR BREAKING AND PACKAGING BLOCKS OF SUGAR.
APPLICATION FILED JUNE 5, 1912.

1,084,887.

Patented Jan. 20, 1914.
5 SHEETS—SHEET 2.

Witnesses

Inventor
Alfred Letort
By Attorney

A. LETORT.
MACHINE FOR BREAKING AND PACKAGING BLOCKS OF SUGAR.
APPLICATION FILED JUNE 5, 1912.

1,084,887.

Patented Jan. 20, 1914.

Inventor
Alfred Letort
Attorney

A. LETORT.
MACHINE FOR BREAKING AND PACKAGING BLOCKS OF SUGAR.
APPLICATION FILED JUNE 5, 1912.

1,084,887.

Patented Jan. 20, 1914.

5 SHEETS—SHEET 4.

Witnesses
John H. Hoving.

Inventor
Alfred Letort
By H. van Oldenburg
Attorney

A. LETORT.
MACHINE FOR BREAKING AND PACKAGING BLOCKS OF SUGAR.
APPLICATION FILED JUNE 5, 1912.
1,084,887.
Patented Jan. 20, 1914.
5 SHEETS—SHEET 5.
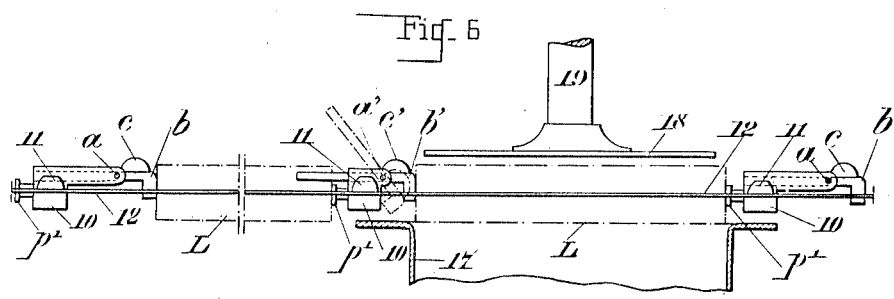
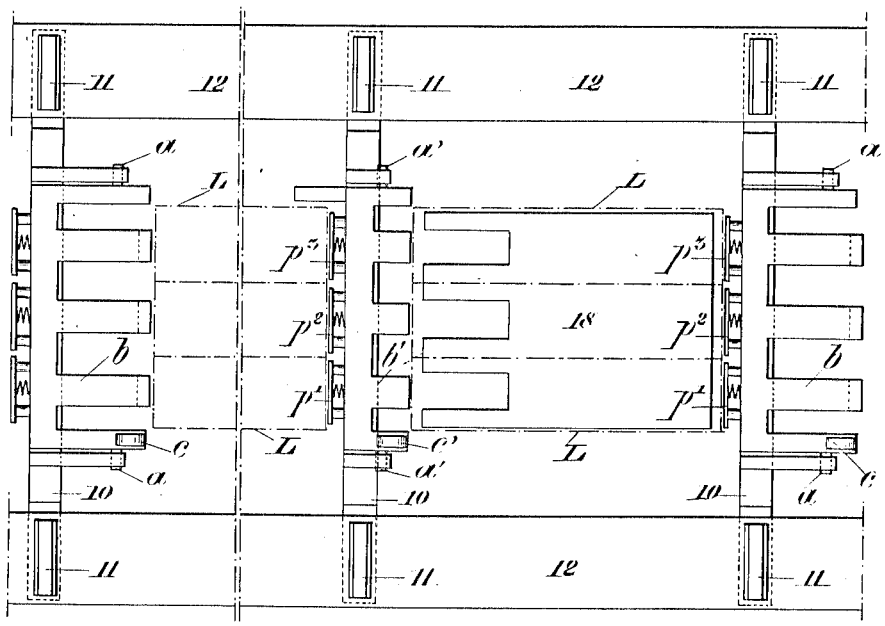
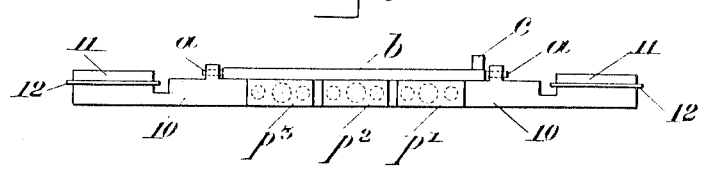
WITNESSES
John H. Hoving.
Alfred R. Anderson
INVENTOR
ALFRED LETORT
By H. van Oldenneel
ATTORNEY

UNITED STATES PATENT OFFICE.

ALFRED LETORT, OF PARIS, FRANCE.

MACHINE FOR BREAKING AND PACKAGING BLOCKS OF SUGAR.

1,084,887.  Specification of Letters Patent.  Patented Jan. 20, 1914.

Application filed June 5, 1912. Serial No. 701,944.

*To all whom it may concern:*

Be it known that I, ALFRED LETORT, citizen of the French Republic, residing at Paris, France, have invented a new and useful Machine for Breaking and Packaging Blocks of Sugar, of which the following is a specification.

The present invention relates to a machine for breaking blocks of sugar into pieces and putting them into boxes, the said machine comprising several parts or devices described below.

The accompanying drawings represent by way of example a machine constructed according to the invention.

Figure 1:
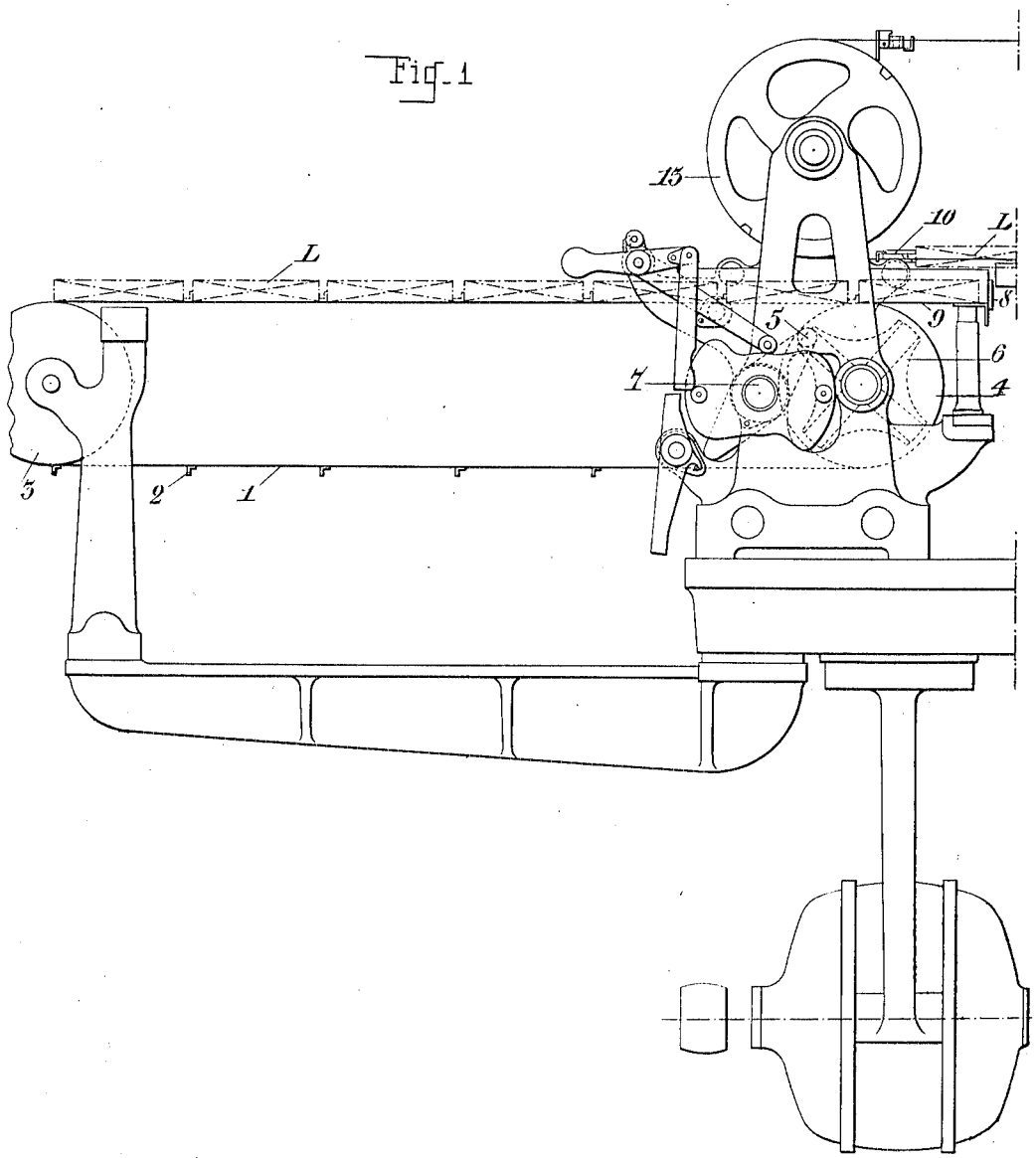
Figure 1:
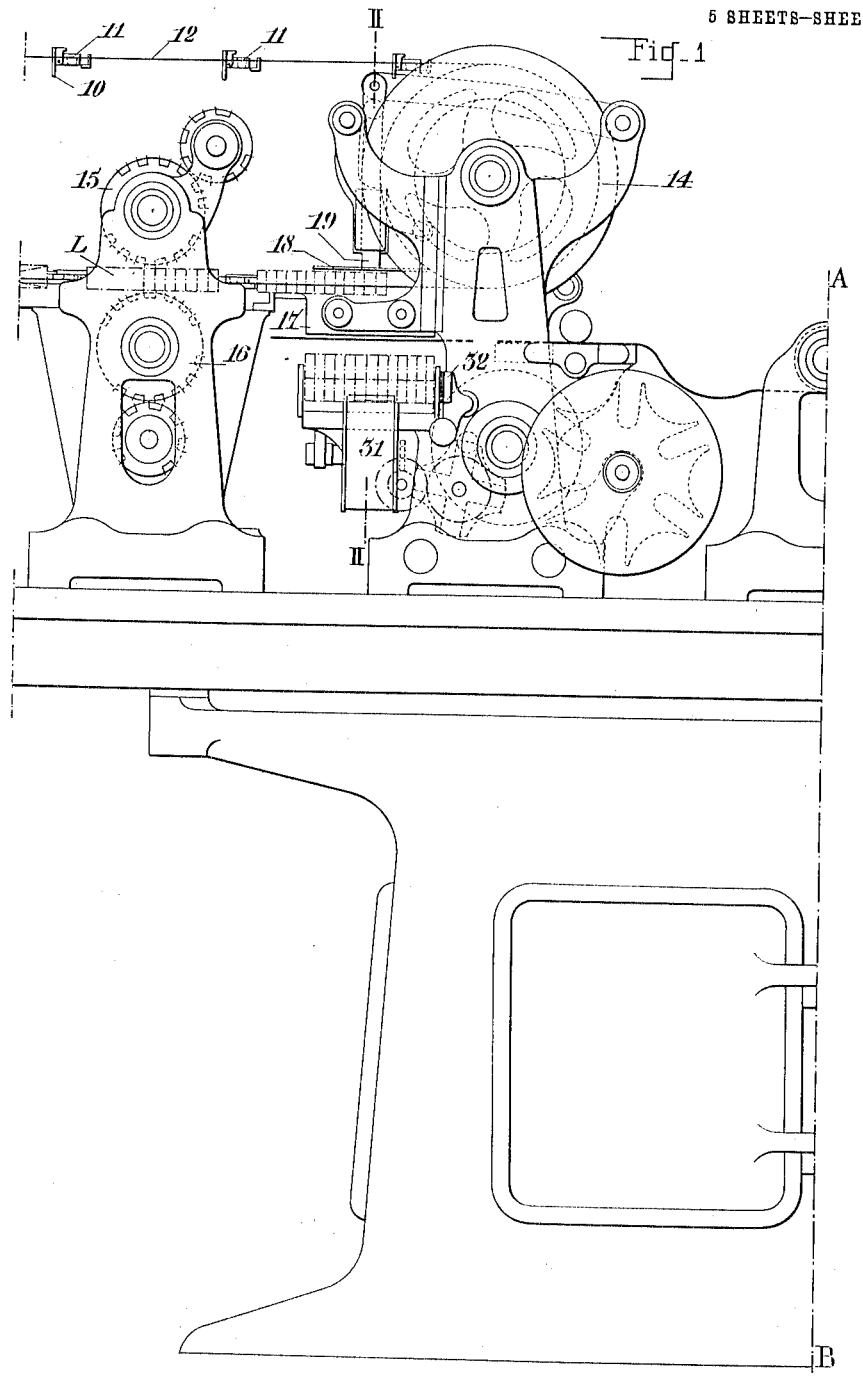
Figure 2:
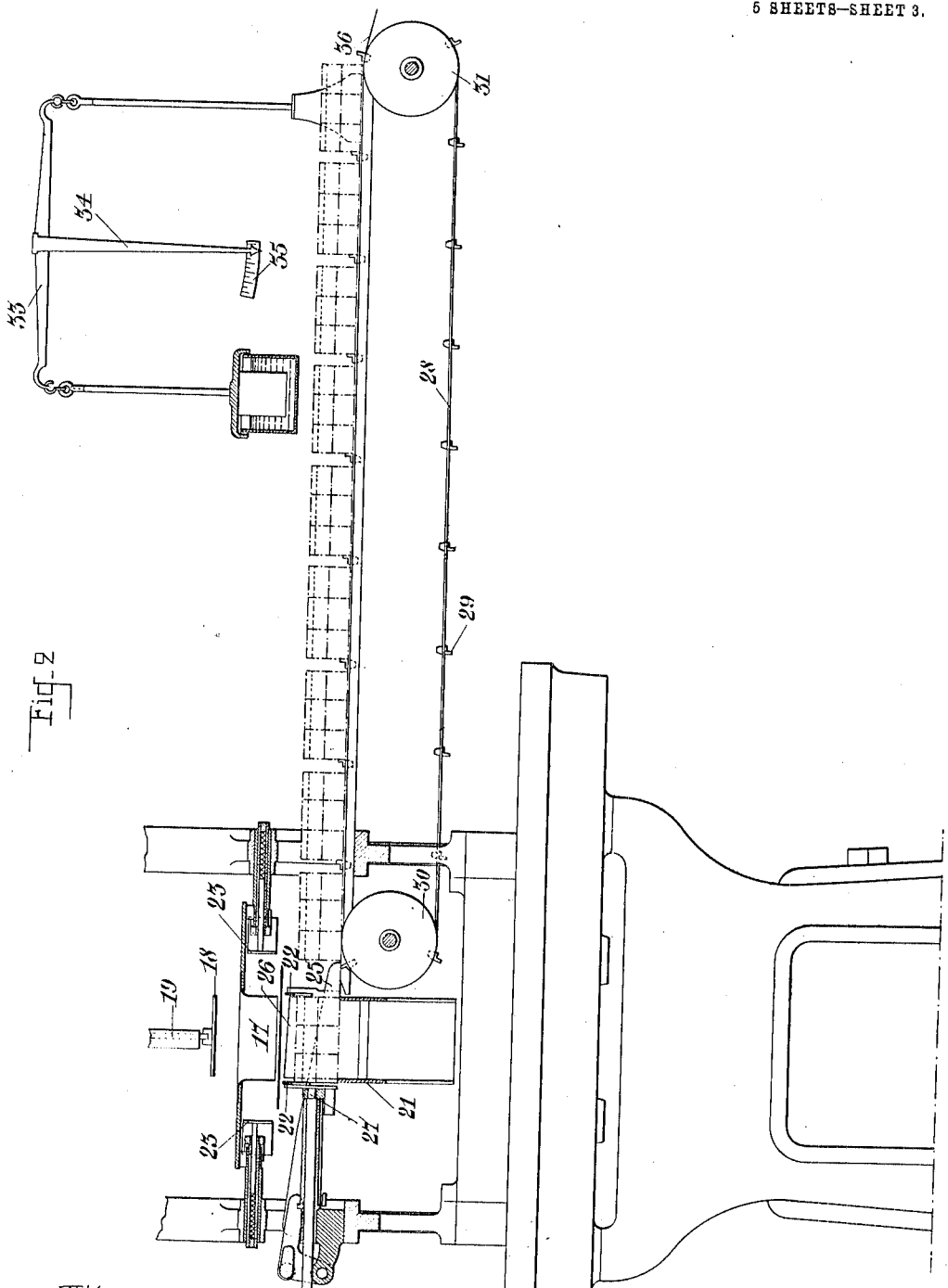
Figure 3:
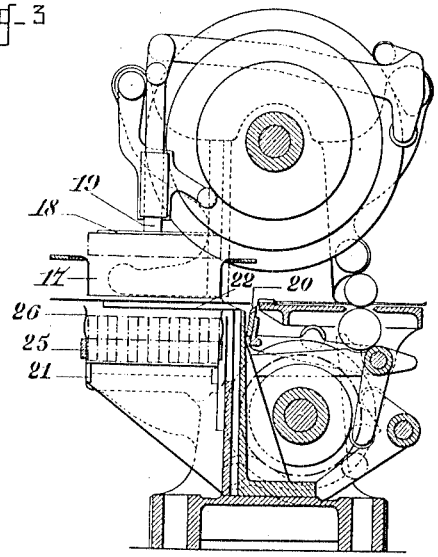
Figure 4:
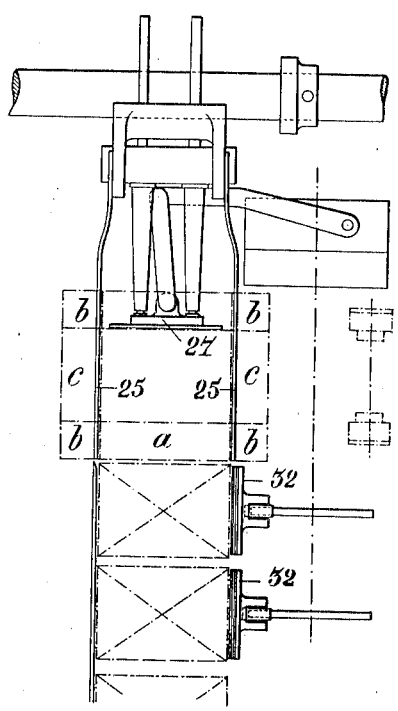
Figure 5:
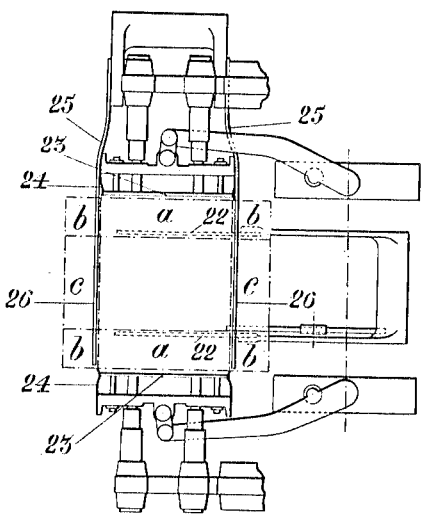

Figures 1 and 1' represent the side elevation of the part of the machine to which the invention more particularly relates. Fig. 2 is an elevation of the machine, partly in section on the line II—II of Fig. 1'. Fig. 3 is a longitudinal section of the device for putting the pieces in the boxes. Fig. 4 is a plan of the device for removing the filled boxes. Fig. 5 is a plan of the device for folding the paper for making the boxes. Fig. 6 is a detail view, in side elevation, of a part of the conveyer device, of continuous movement, for the blocks of sugar, with its jointed pushers and spring pistons. Fig. 7 is a plan view corresponding to Fig. 6. Fig. 8 is a view in front elevation of one of the advancing bars of the conveying device in question.

The same references denote the same parts in all the figures.

The machine also comprises various devices arranged on the right of the line A—B of Fig. 1', for drawing in, gumming, marking the folds and making the slits in the paper from which the boxes are made, but these devices are not shown in the drawings, because they are described in the French Patent No. 414,652 of 31st March 1910 and do not form the subject of the present invention. At the extreme left of Fig. 1 the machine comprises a conveyer, consisting of an endless chain 1, to which are attached bars 2 on which the blocks of sugar are placed by hand, in twos, threes or fours so as to form a surface corresponding to that of the bottom of the box in which they are to be placed. The conveyer chain passes over two drums 3, 4 and receives an intermittent motion controlled by an arm carrying a pin 5 working in the slots of a Maltese cross 6 and actuated by a shaft 7. The blocks are brought by the conveyer against a stop 8, in which position one set of blocks rests on a platform 9, which at a suitable time is raised to the same level as the draw bars 10, whose ends are secured to clips 11, mounted on steel bands 12, forming endless chains, which pass over the drums 13, 14, by which they are kept in continuous movement. The draw bars 10 are provided with plates suitably pivoted for causing the blocks to be drawn forward and with spring operated pistons for keeping the blocks against these push plates; the object of the arrangement being to facilitate the introduction and removal of the blocks.

Figs. 6, 7 and 8 of the annexed drawings represent the details of the method of construction of the continuously moving conveyer device above specified. As these figures show the device in question comprises two endless bands 12, carrying advancing teeth 11, and connected together by transverse bars 10 which carry, on the one hand, projections or pushers $b$, $b'$, capable of tilting about corresponding horizontal axes $a$, $a'$, and on the other hand spring pistons $p'$, $p^2$, $p^3$ capable of sliding in the said transverse, or advancing bars 10, and intended to keep the blocks L on the said pushers. The jointed stops or pushers $b$, $b'$ are combined respectively with cams such as $c$, $c'$, which, by encountering a fixed roller, suitably placed and not shown on the drawing, permits the stops in question to tilt about their axes at the desired moment to take the position indicated in mixed lines on Fig. 6, to permit the introduction and removal of the blocks. It should be noted that the stops $b$, $b'$, as shown in Figs. 6 and 7, are alternately of different length, a length which corresponds to the time necessary for the introduction of the blocks. In addition, as indicated in Fig. 7, these stops are spaced away from each other so as to permit the descending plate 18 to carry out its movement without encountering the said stops; the conveyer 12 is, in fact, given a continuous and uniform movement, and the plate 18 should effect two different strokes without being hindered by this movement. The blocks carried along in this manner are drawn between two cylinders 15, 16, on the circumference of which are blades projecting by an amount carefully determined, which act as shears to break the sugar blocks into pieces of suitable size, according to the number of such pieces required. After the blocks have been divided in this way into pieces which are not however separated, they reach a hollow frame, into which they are forced by a plate 18, which is caused to descend quickly by a plunger 19, operated by any suitable means.

The machine has previously formed around the hollow frame a paper box to receive the sugar, this construction being effected by devices mentioned above and described in the French Patent No. 414,652 of 1910 in combination with the following devices.

The paper prepared as described in the above mentioned patent, is cut to the dimensions required by a knife 20, operated in any suitable manner. After it has been cut the paper is applied by the frame 21 to the lower parts of the sides of the hollow frame 17, of which it forms the base. The fingers 22, which supported the paper, as it was moved forward, are then gently raised by suitable mechanism and effect the preliminary folding of the sides *a*, *a* of the box (Figs. 2, 3, 5); the folders 23 urged by spring pressure press the paper against the sides of the frame 17 and complete the folding. The folders 24 (Fig. 5) continue the action and turn over the gummed flaps *b*. The lever 25 with the spring blades 26 then rises and folds the sides *c* of the box, applying them gently against the sides of the frame 17, while the folders 24 get out of the way of the folders 26. Toward the end of this movement the plate 18 acts on the second row of blocks and this time is moved down more rapidly than before, and drives out the box and the pieces of sugar in the frame 17. The lever 25 also descends at the same time together with the box.

The finished and filled box is taken away by the pusher plate 27 on an endless chain 28 provided with draw bars 29, the chain passing over the conveyer drums 30, 31, from which it receives an intermittent motion by suitable gearing, a pin and Maltese cross for example. When the chain is stopped, the machine exerts a strong pressure on the sides of the box by means of the plates 32, to insure that the parts adhere properly. The boxes are carried away at a given time and mounted on the platform of a weighing machine 33, of which the pointer 34 shows on a scale 35, the number of pieces that must be removed in order to obtain the required weight. The boxes then arrive at an inclined place 36, where the workman 65 receives them.

I claim:

1. A machine intended to break blocks of sugar into pieces and to place them in boxes, the said machine comprising the combination with a known device for presenting box blanks of the following particular devices: an intermittently movable device for conveying the blocks; an elevating platform receiving the blocks from the intermittently moving conveyer; a second conveyer moving continuously, receiving the blocks from the elevating platform; a device to break the blocks; a device with spring pressed nippers, mounted on the continuously moving conveyer, and keeping pressed together, under the form of a single block, the pieces of each broken block; and a device to place the pieces in the boxes, receiving the broken blocks, brought by the conveyer, and pressing them upon the paper prepared to form the box, assuring the definitive form of the latter.

2. In a machine intended to break blocks of sugar into pieces and to place them in boxes, a device to convey the blocks comprising a primary conveyer constituted by an endless chain, moving intermittently, provided with buckets into which the blocks are introduced by hand; an elevating platform receiving the blocks from the intermittently moving conveyer; a second conveyer receiving the blocks from the elevating platform, and composed of conveying bars mounted on two parallel endless belts and having a continuous movement, the said bars supporting jointed stops capable of swinging about a horizontal axis just as the broken blocks are pressed down upon the paper prepared to form the box, and spring pistons to hold the blocks pressed against the above named jointed stops, before, during and after the breaking of said blocks, up to the swinging movement of the jointed stops.

3. In a machine intended to break blocks of sugar into pieces and to place them in boxes; a device for packing into boxes, comprising a conveyer having a continuous movement, and keeping pressed together under the form of a single block, the pieces of each broken block, a plate forming a pusher and causing the broken blocks to pass from the continuously moving conveyer into a funnel around which is arranged the paper prepared to form the box; and folding members to form the necessary folds for the forming of the box, and to assure their gumming.

4. In a machine intended to break blocks of sugar into pieces, and to place them in boxes, an intermittently movable device for conveying the folded and finished boxes;

grippers actuated during the stops of the said conveyer and exerting a strong pressure on the sides of the box, in order to assure the perfect gumming of the latter; and a verification scale receiving the filled boxes from the intermittently movable conveyer.

In testimony whereof I have signed my name to this specification in the presence of two subscribing witnesses.

ALFRED LETORT.

Witnesses:
 JULES FAYOLTET,
 PAUL LEWDEN.